United States Patent [19]

Osborne et al.

[11] Patent Number: 5,531,474
[45] Date of Patent: Jul. 2, 1996

[54] INFLATOR ASSEMBLY

[75] Inventors: Scott Osborne, Rochester Hills, Mich.; Roger E. Bates, Tampa; Anthony C. Burgi, Lakeland, both of Fla.

[73] Assignee: Breed Automotive Technology, Inc., Lakeland, Fla.

[21] Appl. No.: 233,357

[22] Filed: Apr. 26, 1994

[51] Int. Cl.$^6$ .................................................. B60R 21/26
[52] U.S. Cl. ........................ 280/74 D; 280/741; 102/531
[58] Field of Search ................................ 280/736, 737, 280/740, 741; 422/164, 165, 166; 102/530, 531

[56] References Cited

U.S. PATENT DOCUMENTS

| | | | |
|---|---|---|---|
| Re. 28,164 | 9/1974 | Stephenson | 280/737 |
| 2,076,852 | 4/1937 | Leighton | 280/96.1 |
| 3,726,220 | 4/1973 | MacDonald et al. | 102/530 |
| 3,773,352 | 11/1973 | Radke | 102/531 |
| 3,813,112 | 5/1974 | Hermann | 280/736 |
| 3,829,124 | 8/1974 | Charns et al. | 280/737 |
| 3,871,684 | 3/1975 | Staudacher et al. | |
| 3,877,882 | 4/1975 | Lette et al. | |
| 3,878,969 | 4/1975 | Prochazka et al. | |
| 3,985,076 | 10/1976 | Schneiter et al. | |
| 4,005,876 | 2/1977 | Jorgensen et al. | |
| 4,066,415 | 1/1978 | Kasama et al. | |
| 4,131,299 | 12/1978 | Ono et al. | |
| 4,158,696 | 6/1979 | Wilhelm . | |
| 4,278,638 | 7/1981 | Nilsson et al. | 280/737 |
| 4,394,033 | 7/1983 | Goetz et al. | |
| 4,530,516 | 7/1985 | Adams et al. | |
| 4,547,342 | 10/1985 | Adams . | |
| 4,578,247 | 3/1986 | Bolieau | 280/741 |
| 4,590,041 | 5/1986 | Hill . | |
| 4,711,466 | 12/1987 | Breed . | |
| 4,902,036 | 2/1990 | Zander et al. | |
| 4,907,819 | 3/1990 | Cuevas . | |
| 4,923,212 | 5/1990 | Cuevas . | |
| 4,943,086 | 7/1990 | Cunningham . | |
| 4,998,750 | 3/1991 | Werner et al. | |
| 5,000,479 | 3/1991 | Werner et al. | 280/741 |
| 5,003,887 | 4/1991 | Unterforsthuber et al. | |
| 5,004,586 | 4/1991 | Hayashi et al. | |
| 5,048,862 | 9/1991 | Bender et al. | |
| 5,054,811 | 10/1991 | Unterforsthuber et al. | |
| 5,062,367 | 11/1991 | Hayashi et al. | |
| 5,064,218 | 11/1991 | Hartmeyer . | |
| 5,087,070 | 2/1992 | O'Loughlin et al. | |
| 5,100,171 | 3/1992 | Faigle et al. | |
| 5,100,174 | 3/1992 | Jasken et al. | |
| 5,104,466 | 4/1992 | Allard et al. | |
| 5,106,119 | 4/1992 | Swann et al. | |
| 5,114,179 | 5/1992 | Emery et al. | |
| 5,139,280 | 8/1992 | Cord et al. | |
| 5,149,129 | 9/1992 | Unterforsthuber et al. | |
| 5,152,549 | 10/1992 | Aird . | |
| 5,201,542 | 4/1993 | Thuen et al. | 280/736 |
| 5,273,722 | 12/1993 | Högenauer | 280/741 |

FOREIGN PATENT DOCUMENTS

| | | | |
|---|---|---|---|
| 2150465 | 4/1973 | Germany | 280/741 |
| 3937032 | 5/1991 | Germany | 280/736 |

*Primary Examiner*—Karin L. Tyson
*Attorney, Agent, or Firm*—Kane, Dalsimer, Sullivan, Kurucz, Levy, Eisele and Richard

[57] ABSTRACT

An inflator includes a housing formed by two cups interlocked to provide a tamper-proof enclosure with at least one of the cups formed with indentations for grasping by a tool to facilitate assembly of the cups. In a chamber of the housing is an initiator secured in place by a snap-fit. A canister containing tablets of gas generating material is held in the chamber by an interference fit. A filter is held in place in the housing by a ring-shaped retainer member. Passages within the housing direct gases from the initiator to the canister through the filter out of the housing into an air bag with the path of travel changing direction by at least 90° to create turbulent flow for enhanced inflator gas production.

23 Claims, 4 Drawing Sheets

INFLATOR ASSEMBLY

BACKGROUND OF THE INVENTION

A. Field of Invention

This invention pertains to an improved inflator assembly, and more particularly to an improved inflator assembly for inflating an air bag used for protecting passengers in a motor vehicle during a crash.

B. Description of the Prior Art

Air bag systems have become accepted as the primary means of protecting motor vehicle passengers from injury during crashes. It has been estimated that within five years all passenger vehicles sold in the United States will be equipped with such systems. An important part of the air bag system is its inflator assembly, the component which provides the pressurized gas necessary to inflate the bag. Because it plays such a crucial role in the system, the inflator assembly must meet several important criteria. It must be sturdy and robust so that it operates flawlessly years after its original installation without any servicing. It must be strong so that it can withstand the internal pressures resulting from the rapid gas generation process. It must be tamper proof so that it cannot be easily dismantled and tampered by unskilled personnel. It must be relatively small and light weight, especially if it is to be installed in the steering wheel for the protection of the driver. It must be inexpensive to keep down the overall price of the motor vehicles.

While there are several inflator assemblies presently available on the market, none of them meet all of the criteria set forth above.

OBJECTIVES AND SUMMARY OF THE INVENTION

It is an objective of the present invention to provide an improved inflator assembly which is sturdy and resistant to long-term wear and tear in an automobile so that it remains functional over long time periods without the need for servicing.

A further objective is to provide an inflator assembly which is made tamper-proof after assembly.

Yet a further objective is to provide an inflator assembly which provides a tortuous path for gases generated within to insure the expulsion of clean gas to the air bag.

Other objectives and advantages of the invention shall be described below. Briefly, an inflator assembly constructed in accordance with this invention includes a housing formed by two cups positioned and interengaged to define two chambers therein. After assembly the two cups are interlocked to provide a tamper-proof enclosure. At least one of the cups is formed with several indentations arranged to permit the cup to be grasped with a tool during assembly so that the cups can be rotated relative to each other.

Inside one of the chambers there is provided an initiator which sets off the inflator assembly. Advantageously the initiator is snap fit within the housing to insure that it is initially positioned and remains at a predetermined location.

Also provided in the chamber is a canister of tablets made of a gas generating material. The canister is held in an interference fit within the housing to prevent it from moving either radially or axially therein. Also disposed in the housing is a ring-shaped retainer member and a filter held in place by the retainer member. The retainer member is inserted into the housing to support the filter so that the filter does not fall out during assembly.

Within the housing there are passages provided for gases to flow from the initiator to the canister and from the canister through the filter and out of the assembly formed by the interengagement of two cups into the air bag. These passages are arranged to insure that the gases change direction by at least 90° from the initiator to the filter. In this manner a turbulent flow is created to provide sufficient contact between the initiator gases and the tablets for a fast inflator gas production.

DETAILED DESCRIPTION OF THE INVENTION

Figure 2:
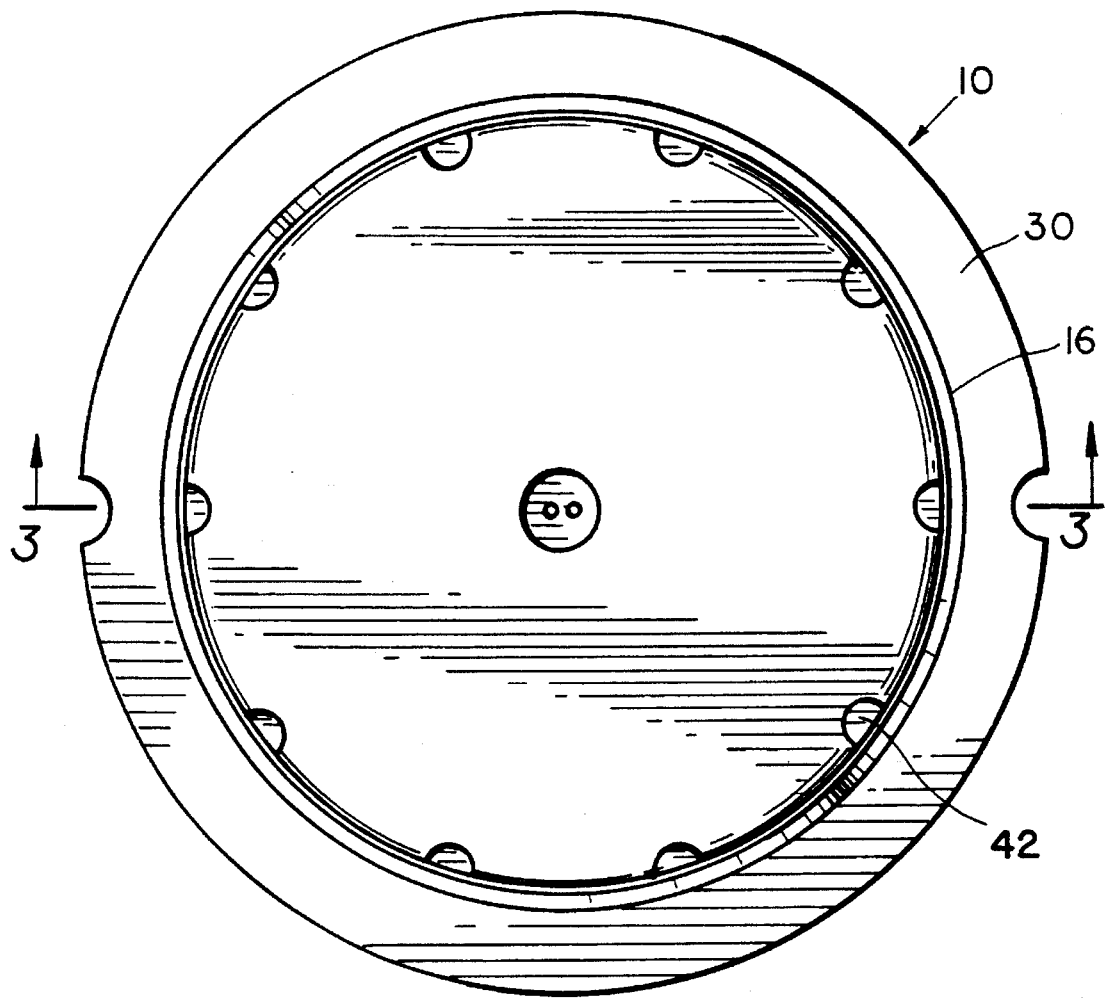
FIG. 2 shows a bottom view of the assembly.
Figure 1:
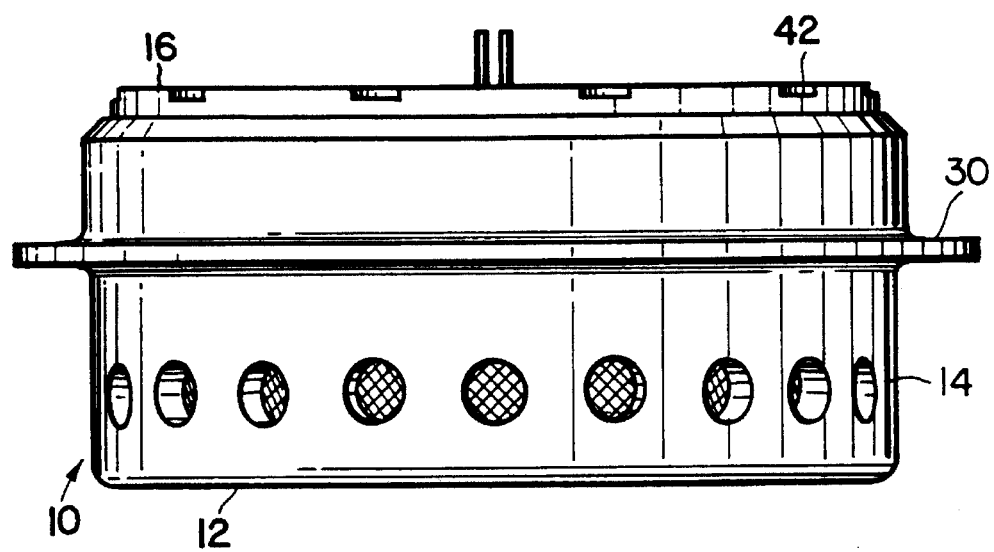
FIG. 1 shows a side view of an inflator assembly constructed in accordance this invention.

In the following directional terms such up, down, top, bottom and so forth are used in conjunction with the orientation of the drawings for the sake of clarity. It should be understood that the assembly described below may have a different orientation once it is installed in a motor vehicle.

Referring now to the Figures, an inflator assembly 10 constructed in accordance with this invention consists of a housing 12 formed of two cups 14, 16. Upper cup 14 is formed of two concentric cylindrical walls, an outer wall 18, and an inner wall 20, both walls extending normally from a base plate 22. Similarly bottom cup 16 is formed of two cylindrical walls 24, 26 extending normally from a base plate 28. A peripheral flange 30 on cup 14 is used for mounting the assembly to an air bag module.

As described in commonly assigned U.S. Pat. No. 5,201, 542, the two cups are secured together by a double threaded arrangement. More particularly, the inner surfaces of walls 18, 20 are threaded and engage the threads formed on the outer surfaces of walls 24, 26 respectively. In this manner, when the housing 10 is closed the two cups are engaged by the threaded co-axial annular couplings 32, 34.

Figure 3:
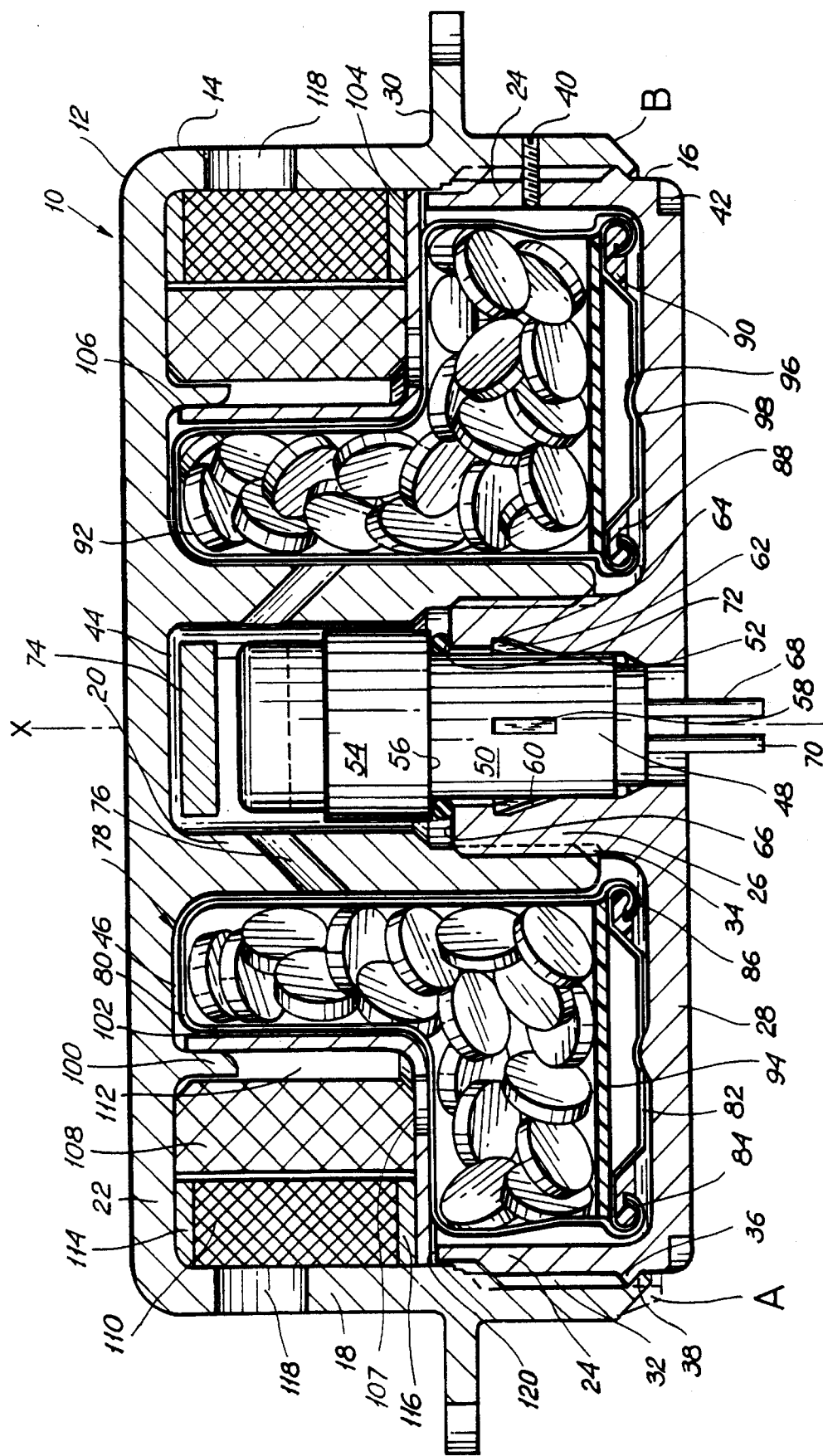
FIG. 3 shows a side-sectional view of the assembly taken along line 3—3 in FIG. 2.
Figure 4:
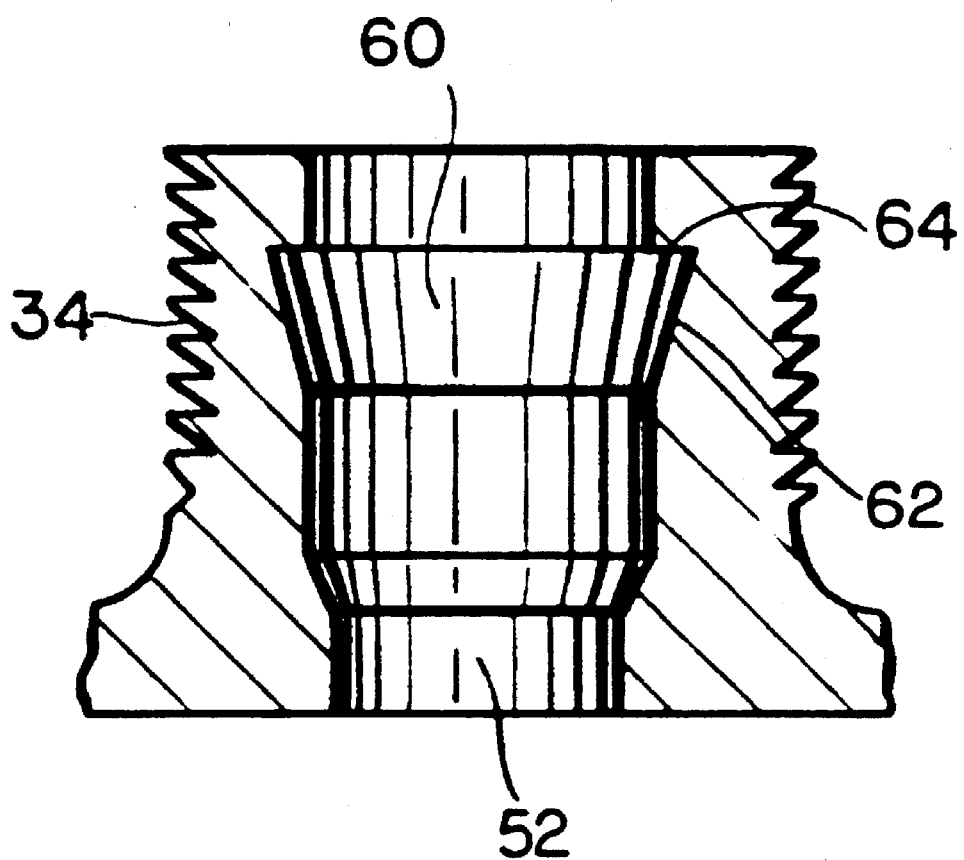
FIG. 4 shows a partial side-sectional view of the bottom cup.

Importantly, wall 24 of cup 16 is formed with an annular rib 36 disposed below the threads. In addition, wall 18 of cup 14 is formed with an axially extending annular lip 38 extending below rib 36 when the two cups are threadedly engaged as described above and as illustrated by letter A in dotted lines in FIG. 3. After the two cups have been engaged, this lip 38 is rolled over rib 36 to mechanically interlock the cups together, as shown in solid lines in FIG. 3 by letter B. This mechanical interlock is provided to insure that after the two cups have been assembled, they cannot be opened and tampered with by unauthorized personnel. In addition, the mechanical interlock provides some mechanical strength for the housing 12. Alternatively, or in addition to the rib and lip arrangement described above, the two cups may also be interlocked by providing holes in the cups and driving spikes 40 through the holes as shown in FIG. 3. Spikes 40 are preferably flush with the outer surface of wall 18 to insure that once they are driven in they cannot be removed.

As it can be best seen in FIG. 3, after the housing 10 is assembled, a substantial portion of the bottom cup 16 is disposed inside, or at least covered by the top cup 14. Hence it is difficult to grasp the bottom cup 16 properly to allow the two cups to be screwed together. In order to solve this problem, bottom plate 28, which is substantially circular in shape, is provided peripherally with a plurality of scallops or notches 42. The purpose of these notches is discussed below.

The two cups 14, 16 cooperate to form two chambers within housing 12, a central chamber 44, and annular chamber 46 disposed coaxially about chamber 44. Chamber 44 is used to hold an initiator 48. Preferably, initiator 48 has a cylindrical body 50 having a diameter slightly smaller than the diameter of hole 52 defined by wall 26 of cup 16. Near the top, initiator 48 has an annular enlarged portion 54 with a downwardly pointed shoulder 56. Below portion 54, initiator 48 is provided with a plurality of flexing fingers 58 arranged annularly about body 50. Each of these fingers 58 extends upwardly toward portion 54 and radially outwardly and are slightly flexible radially.

Hole 52 is formed with an inner annular groove 60 defined by a wall portion 62 extending upward and toward a radially inwardly oriented shoulder 64. The distance between shoulder 64 and the top surface 66 of wall 26 is slightly smaller than the distance between the tips of fingers 58 and shoulder 56 on portion 54.

The initiator includes wires 68, 70 used to send an electrical signal to the initiator 48 for detonation. Wires 68, 70 are connected to an acceleration sensor disposed elsewhere in the system. Alternatively, initiator 48 may include a mechanical acceleration sensor in which case the wires 68, 70 are omitted.

The wall 26 is thus arranged and constructed to engage with the initiator 48 and hold the same in a preselected position inside the chamber 44. For this purpose, initiator 48 may be inserted into opening 52 from the top downward. As the body 50 is moving inward into hole 52, fingers 58 are flexed radially inward. When the tip of the fingers 58 reach groove 60 they snap radially outward thereby locking the initiator 48 into the position shown in FIG. 3. In this position, wires 68, 70 extend outwardly of hole 52 while the portion of initiator 48 disposed above top surface 66 of wall 26 is disposed inside chamber 44. To insure that the initiator 48 remains in this position and does not move or fall out, a resilient O-ring 72 is placed between top surface 56 and shoulder 66. When the initiator is in place the O-ring 72 is squeezed in the axial direction thereby providing an axial biasing force between the initiator portion 54 and surface 66. In this manner O-ring 72 is pulling the fingers 58 upward to remain in engagement with shoulder 64. Additionally, the O-ring 72 also forms a seal around body 50 to insure that the chamber 44 is sealed off from ambient atmosphere.

Above initiator 48, chamber 44 is provided with a pellet 74 made of an auto-ignition material.

Chamber 44 communicates with chamber 46 through a plurality of holes 76. Preferably holes 76 are sloped downwardly at an angle of about 45°. Chamber 46 is used to hold a canister 78 and a filter assembly discussed more fully below. Canister 78 is generally annular in shape and has a generally L-shaped cross section. The canister 78 is formed of two members, a wall member 80 which defines an annular cavity and a ring-shaped cover member 82. The inner and outer edges of the cover member is rolled together with the inner and outer edges of the wall member to form two annular seals 84, 86. These seals are also covered with a potting material as at 88, 90. In this manner the two members 80, 82 form a hermetically sealed canister 78. Canister 78 is used to hold a plurality of tablets 92 which when heated above a preset temperature release a gas very rapidly. A disk shaped member 94 is used to keep the tablets 92 above cover 82. Cover 82 is formed with a circular groove 96. This groove 96 is in contact with a circular ridge 98 formed on the inner surface of base plate 28.

Radially outwardly of canister 78, base plate 22 is provided with a downwardly extending annular wall 100 extending for a short distance inside chamber 46.

Chamber 46 further holds a retaining ring 102. This ring 102 has two annular portions, a substantially horizontal portion 104 and a vertical portion 106. Portion 104 is provided with a plurality of holes 107. Vertical porion 106 is sized so that it forms an interference fit with wall 100 as the ring 102 is inserted into cup 14.

As shown in FIG. 3, above the horizontal portion 104, there are provided two concentric annular filters, 108, 110. Filter 108 is a slag filter and it forms an annular space 112 with the vertical portion 106 of ring 102.

Filter 110 is disposed radially outwardly of filter 108 and is constructed and arranged to pick up fine particles from the gas flow. For example, filter 110 may be made of several layers of a fine filtration material made of paper, cloth, ceramic, and/or other filter media. Preferably the filter media is embedded at the two axial ends in a graphite seal 114, 116 used to insure that gases exiting the chamber 46 do not by-pass the filter 110, however, other means of sealing can be used. As shown in the Figures, the outer wall 18 of upper cup 14 is provided with a plurality of peripheral holes 118 for venting gasses through the filter 110.

The inflator assembly 10 is constructed as follows. The canister 78 is installed into the lower cup 16 and the initiator 48 is snapped into hole 52 from the top. The auto-ignition disk 74 is installed in the upper cup 14, inside wall 20. Filters 108 and 110 are pressed into the upper cup 14 in an inverted position and the retaining ring 102 is pressed on top of filters 108 and 110. Ring 102 may be positioned such that its holes 107 are angularly offset from holes 118 in cup 14.

Figure 5:
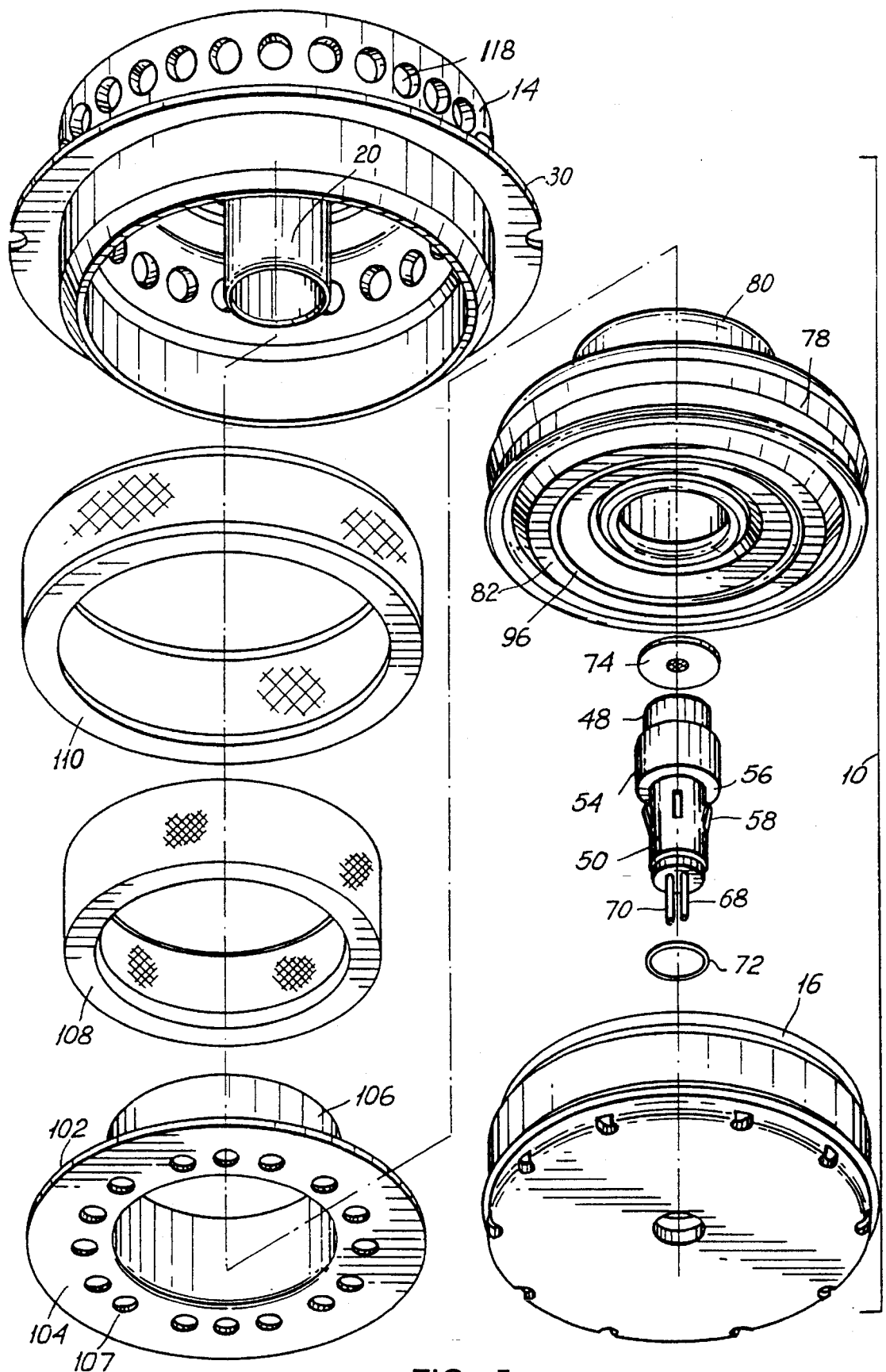
FIG. 5 shows an exploded view of the assembly.

The filters 108, 110 and ring 102 are maintained in this position by the interference fit between ring wall 106 and wall 100. Therefore cup 14 can be turned to the position shown in FIGS. 3 and 5 without the filters 108, 110 and the ring 102 falling out therefrom.

Cups 14 and 16 are then placed into an abutting relationship and one or both cups are turned so that they become threadedly engaged. During this process the bottom cup 16 is grasped with a tool (not shown) having engaging means for engaging the cup 16 by notches 42. Cup 14 and/or 16 is turned until a torque in a preselected range is reached. For example, the cups can be turned until they are torqued at about 35 ft. - lbs.

Once the housing 10 is completed the inflator assembly is ready to be installed. As shown in FIG. 3, as the two cups 14, 16 are screwed together an upper edge 120 of lower cup 16 presses ring 102 upward thereby squeezing the filters 108, 110 and the graphite seals 114, 116 between the horizontal ring portion 104 and base plate 22. At the same time the portion of the canister 78 disposed under ring portion 104 is also captured between ring 104 and base plate 28 of lower cup 16. In this manner the filters 108, 110 and canister 78 are effectively trapped between the base plates 22, 28 and ring 102 to prevent them from movement. The registration between ridge 98 and groove 96 further insures that the canister 78 does not shift in the radial or lateral direction. Thus, the canister is prevented from rattling. This is important because if the canister rattles, the tablets contained therein may pulverize and thereby lose their effectiveness.

The inflator assembly operates as follows. The inflator assembly is normally installed in the passenger compartment of a motor vehicle, for example in the steering wheel. Initiator 48 is connected by wires 68, 70 to a crash detector (not shown). When a crash is sensed by the detector, an electrical signal is received over wires 68, 70 which signal sets off the initiator 48. The initiator 48 acts as a primer to generate a relatively small amount of gases. These gases quickly fill up chamber 44 and flow through holes 76 toward chamber 46. The wall 80 of canister 78 is constructed and arranged so that its wall section disposed in the immediate vicinity of holes 76 is ruptured by the gases from the initiator 48. The gases from the initiator then enter into the canister and set off tablets 92. The tablets 92 then generate gases very rapidly and at a relatively high pressure. These gases rupture the portion of wall 80 disposed adjacent to holes 107 allowing gases to escape into space 112. From this space, the gases exit through the filters 108, 110 and holes 118. Importantly, holes 107 are positioned in such a manner that the gas flow through these holes is oriented at better than 90° with respect to the flow of gases through holes 76. In fact holes 107 are oriented upwardly in an axial direction, i.e. in parallel with respect to the axis X—X of inflator 10, while holes 76 are oriented at 45° downwardly with respect to the axis, therefore the gas flow through these holes are oriented at a respective angle of 135°. This feature is important because it allows causes the gases to flow turbulently through the canister 78 and provide extended contact between the initiator gases and the tablets 92 to insure that tablets 92 are set off rapidly and uniformly. Otherwise the initiator gases could cause the canister wall 80 to rupture prematurely allowing the initiator gases to escape through holes 107 before the tablets are fully set off.

The angular offset between holes 107 and 118 insure a turbulent flow of gases from chamber 46 to the outside. In this manner as theses gases flow through the filters 108, 110, they are cleaned better of particulate mater.

If the inflator assembly overheats, for example in case of fire, the pellet 74 ignites causing the tablets 92 to set off at a preselected temperature. Without the pellet 74, the assembly 10 could overheat to a very high temperature to set off tablets 92. By the time this high temperature is reached, the housing 10 may be weakened and therefore when the tablets 92 are set off the gases generated may cause structural distress.

Obviously numerous modifications may be made to the invention without departing from its scope as defined in the appended claims.

We claim:

1. An inflator assembly comprising:

a housing formed of a first cup and a second cup, each having an inner annular wall disposed about a longitudinal axis, an outer annular wall concentric with said inner wall and a circular base, said walls and base being made integrally and said cups being disposed in a facing relationship with said inner walls being interlocked and said outer walls being interlocked to form with said bases within said housing a central cylindrical chamber and an outer annular chamber;

an initiator disposed in said central chamber;

a retaining member disposed in said outer chamber and arranged for partitioning said outer annular chamber into a first portion and a second portion, said retaining member being a ring having a first ring portion disposed normal to said axis and a second portion disposed in parallel to said axis and to said inner wall;

gas generating material disposed in said first portion; and a gas filter media disposed in said second portion, said retaining member forming an interference fit with said first cup to retain said filter media in said first cup, said first cup being formed with an annular retainer wall of relatively short length to form said interference fit with the second ring portion of said retaining member, said retainer wall being formed on said base of said first cup coaxially with said inner wall.

2. An inflator assembly of claim 1 wherein anti-tempering means are provided for interlocking said first and second cups after said cups have been threadedly engaged for preventing disengagement between the cups, said outer wall of said first cup being disposed radially outwardly of said outer wall of said inner cup and having an annular portion extending below threads formed on an outer surface of said outer wall of said inner cup, said annular portion being deformed radially inwardly of said threaded portion to prevent tampering of said cups.

3. The inflator assembly of claim 2 wherein said anti-tampering a means also includes a stake laterally driven between said outer walls.

4. An inflator assembly of claim 1 wherein anti-tamper means are provided for interlocking said first and second cups to prevent their separation, said outer wall of said first cup being disposed outwardly of said outer wall of said second cup and having an annular portion extending around an outer surface of said outer wall of said second cup, said annular portion being deformed radially inwardly interlocking said first and second cups to prevent separation of said cups.

5. The inflator assembly of claim 4 wherein said anti-tampering means also includes a stake laterally driven between said outer walls.

6. An inflator assembly of claim 1 wherein a plurality of grasping means are disposed on one of said cups for grasping while said cups are being engaged.

7. The assembly of claim 6 wherein said grasping means comprise indentations formed on one of said bases.

8. The assembly of claim 7 wherein said one base is circular and said indentations are formed peripherally about said one base.

9. The assembly of claim 7 wherein the outer wall of one cup is axially shorter then the other outer wall, said indentations being formed adjacent to said one outer wall.

10. The assembly of claim 1 wherein said ring is formed with holes in said first portion for providing a path for gases to said filter media.

11. The assembly of claim 10 wherein the inner annular wall of one of said cups having a plurality of holes extending at an acute angle between the central cylindrical chamber and the first portion of the outer annular chamber.

12. The assembly of claim 11 wherein the outer wall of one of said cups include a plurality of holes normal to the axis for directing gas from the second portion of the outer annular chamber.

13. The assembly of claim 12 wherein the second portion of the outer annular chamber having a concentric part extending from the base of one cup to the base of the other cup.

14. The assembly of claim 1 wherein the second portion of the outer annular chamber having a concentric part extending from the base of one cup to the base of the other cup.

15. The assembly of claim 1 wherein the second portion of the outer annular chamber a having concentric part extending from the base of one cup to the base of the other cup.

16. The assembly of claim 1 wherein a canister containing the gas generator material is disposed in said first portion, said canister being engaged by an interference fit between said retaining ring and the base of the second cup to prevent movement of said canister.

17. The assembly of claim 16 further comprising radial shift prevention means for preventing said canister from shifting radially.

18. The assembly of claim 17 further comprising lateral shift means including an annular groove formed on one of said canister and said base and an annular ridge mating with said annular groove and formed on the other of said canister and base.

19. The assembly of claim 1 wherein said initiator including an initiator wall, said initiator wall and the inner annular wall of one of the cups cooperating to form an interference fit for supporting said initiator in said central chamber.

20. The assembly of claim 19 wherein said initiator wall is provided with a flexible member which is deflected and biased against the inner annular wall of one of the cups when said initiator is inserted into said central chamber.

21. The assembly of claim 20 wherein the inner annular wall of one of the cups is formed with a depression registered with said flexible member.

22. The assembly of claim 21 wherein said flexible member and said depression cooperate of lock said initiator into said central chamber to prevent said initiator from moving out of said central chamber.

23. The assembly of claim 22 wherein said flexible member is provided with a plurality of flexible fingers disposed peripherally around said initiator wall.

* * * * *